United States Patent
Giemborek et al.

(10) Patent No.: US 6,950,105 B2
(45) Date of Patent: Sep. 27, 2005

(54) POWER CONSUMPTION MANAGEMENT IN A VIDEO GRAPHICS ACCELERATOR

(75) Inventors: Vladimir Giemborek, Richmond Hill (CA); Syed Hussain, Toronto (CA); David Chih, North York (CA)

(73) Assignee: ATI Technologies Inc., Markham (CA)

( * ) Notice: Subject to any disclaimer, the term of this patent is extended or adjusted under 35 U.S.C. 154(b) by 415 days.

(21) Appl. No.: 10/161,022

(22) Filed: Jun. 3, 2002

(65) Prior Publication Data

US 2003/0222876 A1 Dec. 4, 2003

(51) Int. Cl.[7] .............. G06T 1/60; G06T 1/00; G06F 1/26; G09G 5/36
(52) U.S. Cl. .......... 345/501; 345/522; 345/545; 345/52; 713/300; 713/320; 713/322
(58) Field of Search .......... 345/418, 501–503, 345/522, 530, 531, 534, 538, 543, 545, 556, 559, 204, 24, 52; 320/114–115; 702/130–132; 713/300, 320, 322, 323, 340, 400, 500, 501, 321, 601

(56) References Cited

U.S. PATENT DOCUMENTS

| | | | | |
|---|---|---|---|---|
| 5,414,455 A | * | 5/1995 | Hooper et al. | 725/88 |
| 5,675,808 A | | 10/1997 | Gulick et al. | |
| 5,991,883 A | * | 11/1999 | Atkinson | 713/300 |
| 6,134,167 A | * | 10/2000 | Atkinson | 365/222 |
| 6,192,479 B1 | * | 2/2001 | Ko | 713/300 |
| 6,263,448 B1 | | 7/2001 | Tsern et al. | |
| 6,460,125 B2 | * | 10/2002 | Lee et al. | 711/167 |
| 6,636,912 B2 | * | 10/2003 | Ajanovic et al. | 710/105 |
| 2003/0065960 A1 | * | 4/2003 | Rusu et al. | 713/300 |
| 2003/0115013 A1 | * | 6/2003 | Dendinger | 702/132 |

* cited by examiner

Primary Examiner—Matthew C. Bella
Assistant Examiner—Wesner Sajous
(74) Attorney, Agent, or Firm—Vedder, Price, Kaufman & Kammholz, P.C.

(57) ABSTRACT

A method and apparatus matches one or more clock speeds used in, or used by, a graphics accelerator so as to match graphics processing requirements to the speed of the clock source or sources. Clock speed is adjusted under software control to match current requirements. Power is conserved by reducing clock speeds from unnecessarily high rates to a rate that can satisfy current display mode settings and other graphics processing demands.

12 Claims, 4 Drawing Sheets

POWER CONSUMPTION MANAGEMENT IN A VIDEO GRAPHICS ACCELERATOR

FIELD OF THE INVENTION

The present invention relates to a method and apparatus for reducing the electric power consumed by battery-powered electronic equipment that uses video graphics accelerators.

BACKGROUND OF THE INVENTION

Graphics display devices, such as liquid crystal displays (LCDs), are currently used in a host of electronic devices such as laptop computers, personal digital assistants (PDAs) and portable video game consoles. A problem that all portable electronic equipment contends with is battery life. Battery life in power portable computer equipment can be extended if the power consumed from the battery is reduced. It is well known that the power consumed by a processor-driven electronic device can be reduced (and therefore battery life extended) by slowing the speed of the processor that runs the device. In electronic equipment that use graphics accelerators to drive a graphic display, power consumption can be reduced by slowing the graphics accelerator.

In prior art methods, the memory clock speed was reduced to one or two discrete frequencies. Prior art methods simply reduced a clock speed. They did not attempt to match actual processing requirements to memory clock speeds or graphics processor clock speeds so as to minimize power consumption without sacrificing graphics display performance. A power reduction method and apparatus that matches a graphics processor and memory clock speeds to the actual processing requirements would be an improvement over the prior art.

DETAILED DESCRIPTION OF THE PREFERRED EMBODIMENTS

In a graphics accelerator for use with graphics displays, there is provided a method and apparatus for matching at least one of a memory clock speed and graphics processing engine clock speeds to current graphics processing requirements. For purposes of claim construction, the concept of "matching" a clock speed to graphics processing requirements should be considered to be adjusting a clock speed so as to at least satisfy current processing requirements but not exceed current processing requirements so that electrical power isn't needlessly consumed by the graphics processor. By matching graphics accelerator clock speeds to actual graphics display requirements, battery power is conserved, (i.e., power in a battery or other, limited-life power source is not wasted) but without sacrificing graphics display performance.

Figure 1:
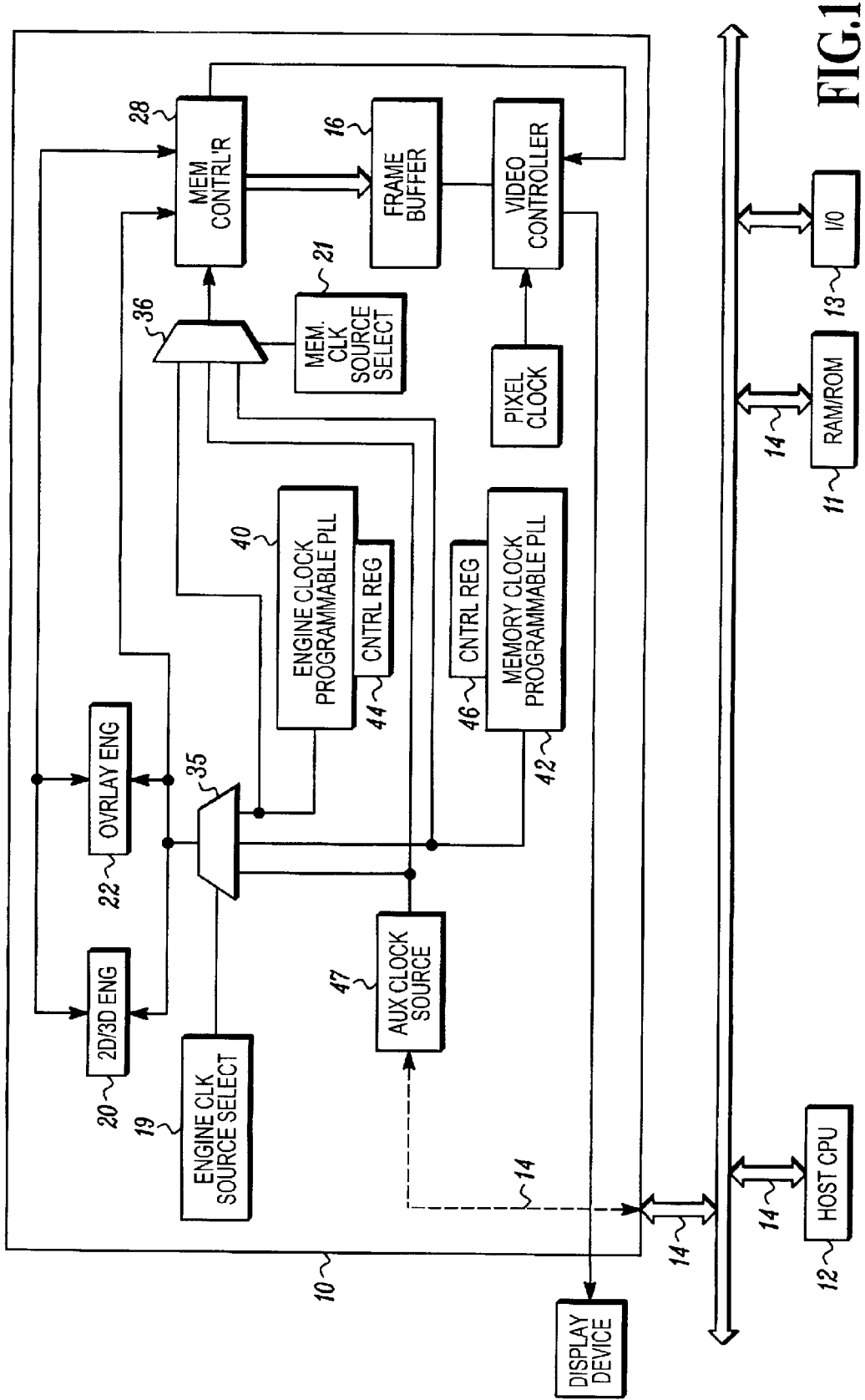
FIG. 1 is a block diagram of a video graphics accelerator that matches clock speeds to processing requirements to provide reduced power consumption.

FIG. 1 shows a block diagram of a power-consumption-adjustable graphics processing circuit, embodied as a graphics accelerator identified by reference numeral 10. The graphics processing circuit 10, referred to hereafter as a graphics accelerator 10, matches the speed at least one of two or more clocks to levels (speeds) under software control to a rate sufficient to satisfy current display requirements. Clock speed matching occurs under the direction and control of software (a computer program) running on a host CPU 12, via signals on a system bus 14, which couples the CPU 12 to the graphics accelerator 10 when the power source for the graphics accelerator 10 is determined to be battery or other limited-life power source.

Although an AC to DC transition can be used to determine when to initiate clock speed matching to display requirements, it will also be recognized that other events can also be used, such as a die temperature thresholds or other suitable thermal conditions. For example, a thermal sensing circuit may be thermally coupled to the graphics processing circuit, as known in the art, to monitor the temperature of the graphic processing circuit so that even during AC operating conditions, the energy saving operations described herein may be initiated to reduce die temperature.

In a preferred embodiment, the system bus 14 over which signals are carried between the host CPU 12 and the graphics processing circuit is embodied as the "PCI" bus, well-known to those of ordinary skill in the art. Other system bus architectures can be readily used.

The functional element identified by reference numeral 16 is a frame buffer memory 16. In a preferred embodiment, the frame buffer memory 16 is an array of addressable semiconductor memory locations in which graphics data is stored. The memory bus widths of 32, 64, 128 or greater widths can be used. The graphics data stored in the frame buffer 16 is used by a CRT controller to create graphic images that appear on the screen of a monitor or LCD panel or other display device.

CRT controllers, CRT displays and LCD displays are all well-known to those of ordinary skill in the art. An understanding of their respective operations is not germane to the invention disclosed and claimed herein and therefore, descriptions of their operations are omitted for brevity.

Data stored in the frame buffer 16 is generally known in the art as frame buffer data. Frame buffer data can be generated by, and therefore can originate from, one or more graphics processor engines (identified by reference numerals 20 and 22 and referred to herein as "graphics engines") that operate on image data obtained from a host CPU via the system bus 14, or the frame buffer memory 16. One such engine is known as a two-dimensional/three-dimensional (2D/3D engine) 20.

Two graphics engines are shown: the 2D/3D engine generates data that is used to create two-dimensional and three-dimensional images on a display device. An overlay engine 22 is used to generate data used to create the appearance of full-motion video on the display device.

Both of the graphics engines 20, 22 are special-purpose processors, which require input clock signals to process data. In a preferred embodiment, both of the graphics engines 20, 22 are capable of operating at different clock speeds. Power conservation can be realized by running the engines slower. The faster that the graphics engines 20, 22 operate, the greater their processing capability, however, the power they consume is directly related to the clock speeds at which they are operated. Adjustable-speed clock sources for the graphics engines 20, 22 are provided by programmable phase-locked loops, which are described more fully below.

Data that is input to, and output from the 2D/3D graphics engine 20 is used to render two-dimensional (2D) or three-dimensional (3D) images on a display screen, such as a CRT or LCD panel. The 2D and 3D graphics data is stored in the frame buffer memory 16.

Like the graphics engines 20, 22 the frame buffer memory 16 can also be accessed at different clock speeds. In general, the amount of power consumed by the frame buffer memory 16 is proportional to the speed of the clock used to access the frame buffer memory 16.

Output data from the graphics engine 20 and the overlay engine 22 is written into or read from the frame buffer 16 (for use by the aforementioned video controller), under the direction of a memory controller 28. Among other things, the memory controller 28 determines which portions of the frame buffer memory 16 are accessed by the 2D/3D engine, which portions are to be accessed by the overlay engine 22. For purposes of performance, reliability as well as flexibility, both the 2D/3D engine 20 and the overlay engine 22 can be "clocked" by one of at least three clocks 40, 42 and 47. The particular clock used to control the graphics engines 20, 22 is selected under software control, using a graphics processor clock source multiplexor 35, which operates under the control of an engine clock source selector 19.

A first clock 40 normally drives the graphics processors 20 and 22 and is denominated as graphics processor engine clock or "engine clock" because its principal function is to drive the graphics engines 20 and 22. The output of the engine clock 40 is shown in FIG. 1 as being coupled to an input of a multiplexor denominated as the graphics processor clock source multiplexor 35.

A second clock 42, the principal function of which is to drive the frame buffer memory 16 is denominated as a "memory clock." It is also coupled to an input of the graphics processor clock source multiplexor 35 and multiplexor 36.

In addition to the engine clock 40 and memory clock 42, an auxiliary clock 47 is also coupled to an input of the graphics processor clock source multiplexor 35 and multiplexor 36. The auxiliary clock 47 can be a copy of the system bus 14 clock, a phase-locked loop or any other stable clock.

In order to match clock speeds to processing requirements, the clock sources 40 and 42 are implemented as programmable phase-locked loops (PLLs). The speeds of each programmable phased-locked loop clock source 40 and 42 can be independently specified by the contents of separate, multi-bit, frequency-control register operatively coupled to each programmable PLL. By writing different bit patterns or values into the control registers 44 and 46, the host CPU 12 can vary the output frequency of the associated programmable phased-locked loop to which it is coupled. Accordingly, for purposes of claim construction, the programmable phased-locked loop 40 is considered to be a programmable phased-locked loop graphics processor engine clock source; the programmable phased-locked loop 42 is considered to be a programmable phased-locked loop frame buffer memory clock source;

As shown in FIG. 1, the contents of PLL control register 44 (i.e., the frequency control register) establishes the output frequency of the programmable PLL engine clock 40; the contents of control register 46 establishes the output frequency of the programmable PLL memory clock 42. Embodiments of software-adjustable clock sources, including programmable PLLs are known to those of ordinary skill in the art.

In a preferred embodiment, access to the control registers 44 and 46 is had by way of the system bus 14. Control register access is considered to be the ability to set the registers' contents. As a result of ability to access the control registers, the host CPU 12 can write different values into the control registers 44 and 46 so as to control the output speeds of the engine clock 40 and the memory clock 46. The control registers 44 and 46 are loadable with different values under the control of software running on the host CPU 12 so that the two clocks 40 and 42 can be run at different speeds, established by the registers 44, and 46 contents.

An almost unavoidable consequence of changing the frequency of the programmable clocks 40 and 42 is that during the time while their frequencies are changing, their output pulse trains are unstable. It is for at least that reason that different clock sources can be directed to the graphics engines 20 and 22 under the control of the clock source multiplexor 35. Similarly, different clock sources can be used for the frame buffer memory 16.

During the interval that the rate of the programmable PLL is changing, the graphics engines 20 and 22 are clocked from either the auxiliary clock source 47 or the programmable PLL memory clock source 42 (referred to as an interim clock source) by control signals sent to the multiplexor 35 from the host CPU 12.

In one embodiment, signals from the host CPU are sent to the engine clock source select circuit 19, which interfaces the multiplexor 35. During the time that the frequency of a programmable clock source is being changed, an alternate clock source that is delivered in place of the changing clock source is considered to be an interim clock source. An interim clock source is preferably provided for the entire time that a programmable clock is changing, however, using an interim clock source for at least part of the programming time might alleviate clock source-generated anomalies in the outputs of the graphics engines 20 an 22 or in the frame buffer memory 16, if an interim clock is used for only part of the time that the programmable clock source is changing. Once a programmable clock source, such as the programmable engine clock 40, has stabilized, it is re-established as the graphics engines 20 an 22 clock source, also under software control.

The decision of which clock source to use to drive the graphics processors 20 and 22 is made under the control of software running on the host CPU 12. The electrical coupling of the engine clock source select circuit 19 to the system bus 14 is not shown in FIG. 1 for clarity.

In addition to changing the graphics engines 20 and 22 clock speeds under software control, the speed of the frame buffer memory clock can also be changed under software control.

Like the graphics engines clock source described above, the frame buffer 16 clock source is also software selectable during the time that the programmable frame buffer 16 clock source is adjusted, in order to prevent possible data loss or corruption that might occur due to the instability of the programmable PLL memory clock 42 during the time that the clock 42 is changing from one frequency to another. During the time that the clock 42 is changing, the frame buffer memory can be clocked by either the engine clock 42, or, the aforementioned auxiliary clock 47 as interim clocks for the frame buffer memory 16.

Power conservation in the graphics accelerator 10 is achieved, without sacrificing graphics processing, by matching the speeds of adjustable clocks so as to provide only the processing power required. As set forth above, the clock sources 40 and 42 in the graphics accelerator 10 shown in FIG. 1 are programmable so as to match their speed to processing requirements. Their speeds can be changed, under software control. As a result, the power they consume can also be changed under software control.

The software to change the speeds of the programmable PLL clocks 40 and 42 is preferably part of the driver software supplied with the graphics controller 10. Alternate embodiments would include operating system software that is capable of appropriately communicating with the control registers 44 and 46, and perhaps the clock source select circuits 19 and 21.

The architecture of the graphics accelerator 10 shown in FIG. 1 enables separate control of the frame buffer memory 16 clock and the clock supplied to the graphics engines 20 and 22 thereby providing flexibility in power consumption control. One clock or the other or both can be adjusted so as optimally match performance (and adjust power consumption) to requirements.

As set forth above, the power consumed by a video graphics accelerator (including the graphics accelerator 10 shown in FIG. 1) is directly proportional to the clock speeds of the device. Those clock speeds however, determine the data processing capabilities or "bandwidth" of the graphics accelerator. Reducing the graphics accelerator's clock speeds without regard to the processing expected of the graphics accelerator by the software running on the host CPU, or mode settings of the operator, can adversely affect image quality on the display device. As a result, it is preferable to match graphics accelerator clock speeds to processing requirements, under software control (both memory and/or graphics engines) so as to preserve graphics quality without wasting power by running graphics accelerators clocks needlessly too fast.

Required graphics processing is determined by factors that include the software running on the host CPU 12, but also by various display mode settings of the computer (also known as mode settings). Display mode settings include, but are not limited to, screen resolution, pixel or color depth, the screen refresh rate and whether there are single or perhaps multiple CRT controllers accessing the same or different images in the frame buffer. By way of example, large LCD panels, or very high CRT screen resolution settings, and extended color depth and high refresh rate, will all necessitate higher clock speeds from the graphics engines, as compared to smaller-sized LCD panels, lower screen resolutions, limited color depth or low screen refresh rates.

The first step of matching graphics accelerator clocks to processing requirements is to determine the current graphics processing capacity. In general, a "graphics processing capacity" is measured in available frame buffer memory bandwidth. Available frame buffer memory bandwidth can be calculated as a function of the frame buffer memory clock speed, in megahertz, frame buffer memory width and memory type.

Graphics processing requirements are determined, in part, by display mode settings. Accordingly, a first step of matching graphics accelerator clocks to processing requirements is to read display mode settings which are stored in system memory (not shown in FIG. 1 for clarity) as display mode data. Mode settings can therefore be determined under software control by testing mode data.

After the display mode settings are determined, the amount of processing power required to accommodate the display mode settings is calculated. Once the required graphics accelerator performance is determined, the graphics accelerator clock speeds are adjusted to a lower level, under software control, so as to reduce power consumption.

In a preferred embodiment, at least one of the two clock speeds are adjusted incrementally upward, by writing different bit patterns into the control registers 44 and 46, until the incrementally increasing clock speeds are determined to be sufficient to meet graphics processing requirements. In an alternate embodiment, an adequate clock speed is calculated and implemented by writing an appropriate value into the control registers 44 and 46.

Figure 2A:
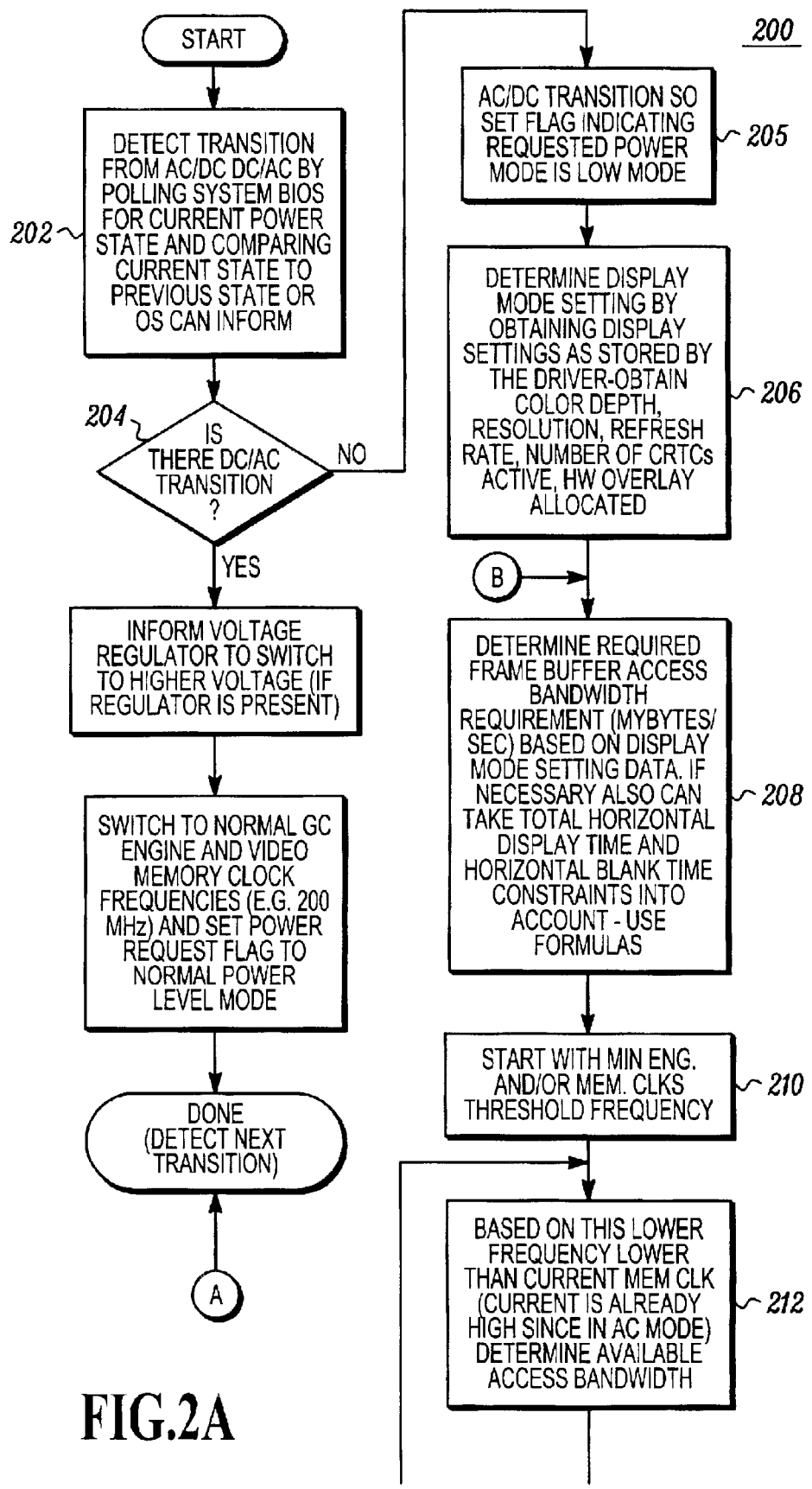
FIGS. 2A and 2B show a flow chart showing the steps of a method by which power consumption by a video graphics accelerator can be reduced when the power supply changes from AC source to a battery.
Figure 2B:
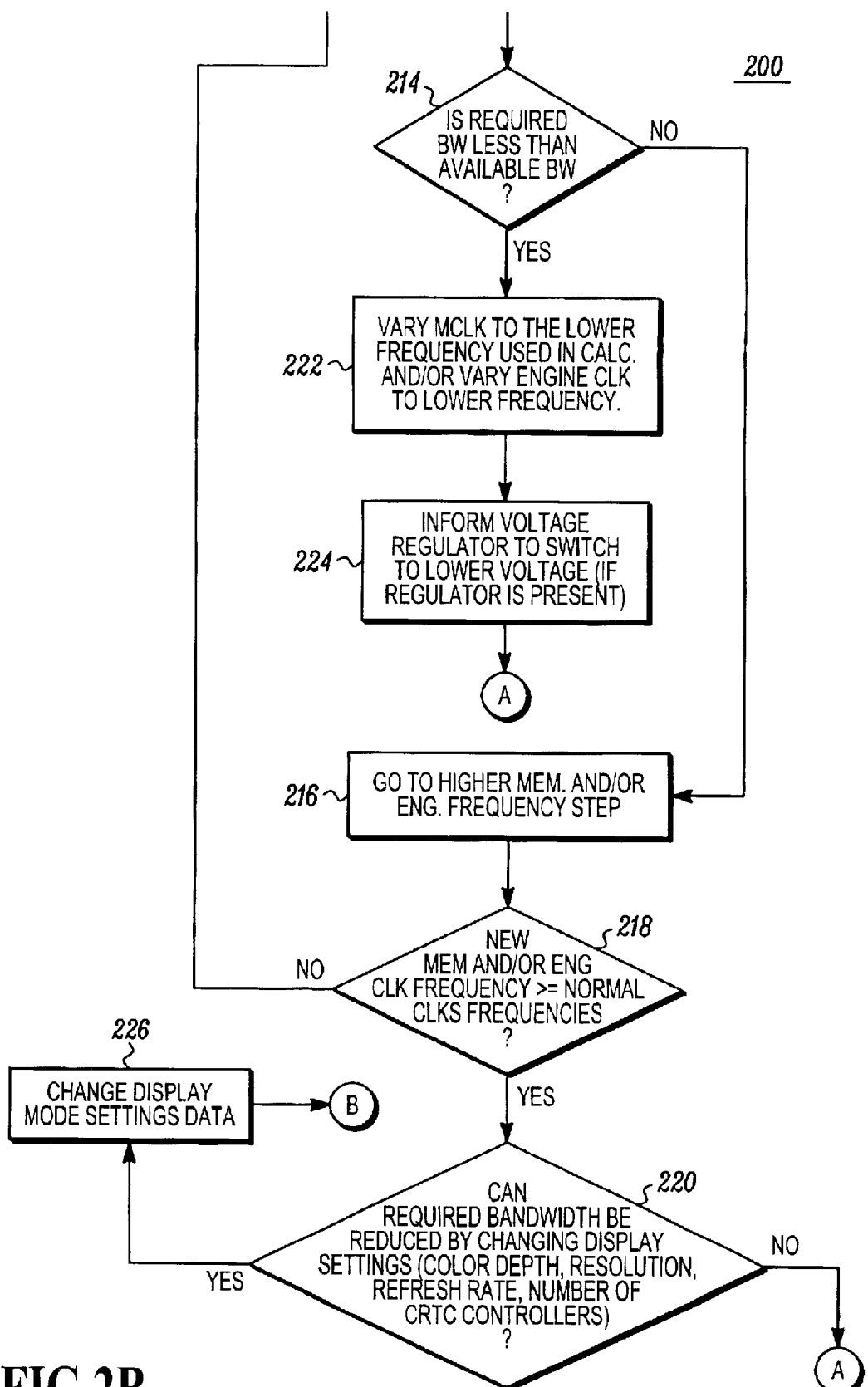

In another embodiment and in association with the overlay engine 22, a determination is made whether a so-called "hardware overlay surface" has been allocated and from that determination, the bandwidth requirements of the video overlay engine 22 and the mode settings are determined followed by the clock speed reduction. The method of a preferred embodiment is depicted in FIGS. 2A and 2B. A hardware overlay surface is considered to be a portion of the frame buffer set aside for video overlay and it imposes additional graphics processing requirements due to the fact that data for the video must be written into and read from the frame buffer memory. A video overlay is considered to be at least an area or portion of a display device wherein video is presented.

The method disclosed and claimed herein finds particular application in battery-powered equipment. Accordingly, the first step 202 of the method of a preferred embodiment 200 is to detect whether the power source for the device using the graphics accelerator 10 changed from an AC source to a DC source. The transition from an AC power source to a DC power source can be accomplished by polling the host CPU 12 BIOS for the current power-source state and comparing the current power-source state to a previous state. Alternatively, the operating system used by the host CPU 12 can provide an explicit message or register data value indicating that the current power source for the system is a battery.

If the host CPU 12 BIOS detected and flagged a power source transition, at step 204, a test is performed to determine if that power source transition has occurred. If as detected in step 202, the power source transition was from an AC source to a DC source, at step 204, program control will proceed to step 205 where a power source transition flag can be set.

As stated above, other events can also be used to initiate clock speed matching, such as a die temperature thresholds or other suitable events. A thermistor or other thermal sensing circuit electrically coupled to the host CPU 12 or other processor can be thermally coupled to the graphics processing circuit package or substrate, or, to the graphics processing engines 20 an 22, the frame buffer memory 16 or the programmable phased-locked loops so as to sense one or more temperatures. Sensed temperature can thereby be used to initiate the energy saving operations described herein so as to reduce the sensed temperature to a level specified by a value stored in memory.

In some instances, the host CPU might not be able to immediately turn down the clock speeds of clocks used in the graphics accelerator 10 but might need to wait until the graphics accelerator 10 has gone idle for instance. A power transition flag set in step 205 enables the host CPU 12 to return to the clock speed adjustment process.

Display mode settings are obtained at step 206 by reading display mode data, typically by reading that data from the system memory 11. As set forth above, display mode settings can include, but are not limited to color depth, screen resolution, screen size, refresh rate or the number of active CRT controllers driving displays attached to the device. The display mode data can be obtained from memory by the host CPU 12.

Although the preferred embodiment contemplates that the host CPU 12 performs the functionality disclosed herein, other processors having access to display mode data and/or the graphics accelerator registers and control circuits could function just as well. For instance, an example of another processor would include a processor resident in, or on a circuit board carrying the graphics accelerator 10. Such a processor could be granted control of the system bus 14 by the host CPU 12 so as to enable it to determine if a D.C. power source is being used, read display mode data from system memory, and thereafter, adjust clock speed of the programmable clock sources. Such other processor is another structure by which graphics accelerator clock speeds can be varied to match graphics processing requirements.

After the host CPU 12 or other processor, obtains the display mode settings from a memory, the host CPU 12 or other processor determines the required frame buffer access bandwidth requirement in megabytes per second, based on the display mode settings obtained in step 206.

In one embodiment, adjustment of the clocks is performed by setting the clocks to their lowest speeds and calculating whether the lowest speed is adequate to meet demand. Step 208 is performed by setting the programmable PLL clocks 40 and 42 speeds to their lowest programmable settings by writing an appropriate value into the corresponding control registers 44 and 46.

Frame buffer 16 access capacity is calculated at this first frequency and compared to the frame buffer 16 required access bandwidth determined using the display mode settings obtained from step 206.

If the frame buffer 16 access capacity at the lowest-programmable clock speed of clocks 40 and 42 is determined to be insufficient, the calculation is repeated at the next-highest programmable clock speed of the programmable PLLs 40 and 42. The available access bandwidth at the next-highest available clock speed is compared to the required frame buffer access bandwidth obtained from step 206 again. The process of calculating frame buffer access bandwidth provided by successfully higher clock speeds is repeated until the calculated frame buffer access capacity at least meets or exceeds the required frame buffer access bandwidth determined from the current display mode settings or other video processing requirements determined in step 206.

As shown in FIG. 2A, step 210 is to start with a minimum engine and/or minimum memory clock threshold frequency. At step 212, based on the lowest frequency, the available access bandwidth is calculated. In FIG. 2B, at step 214, a determination is made whether the required bandwidth is less than the available bandwidth provided by the clock speed used in the calculation of step 212. If the required bandwidth is higher than the available bandwidth provided by the initially-chosen clock speed, program control proceeds to step 216 where the clock speed is increased. If the new clock speed has not exceeded the normal clock frequency, as determined in step 218, program control returns to step 212 where it and step 214 are repeated. If the incremental increase in the clock speed as a result of step 216 is greater than or equal to the normal clock frequencies, program control proceeds to step 220 where the operator is provided with an opportunity to change the required bandwidth by altering the display mode settings such as color depth, refresh rate and screen resolution, etc. From step 220, program control can go two different ways.

If the re-programmed clock speeds (i.e., the frame buffer memory clock and the graphics processing engine clock) are greater than or equal to their normal rates, no power savings can be realized. One or more display mode settings can be changed in step 226 so as to provide a choice of saving power by sacrificing one or more settings in which case program control proceeds back to step 208. If changing the display mode settings are not desired, program control terminates. If display mode settings are changed, the required clock speed for the revised display mode settings is recalculated in an effort to reduce the clock speed to that which is only required to support the revised display mode settings.

Returning to step 214, if the required bandwidth is less than the available bandwidth provided by the revised clock speed, program control proceeds to step 222 where the actual clock frequencies are reduced to the calculated values. The reduced clocks apply to the 2D/3D engine as well as the overlay engine and the frame buffer. At step 224, the reduced clock speeds may enable a lower output voltage from the battery source and as a result, a voltage regulator command can be issued instructing the power supply voltage regulator to reduce the supply voltage so as to further reduce current draining from a battery.

The following pseudo code implements the preferred method of determining available and required display memory bandwidth. /* variables used in the ensuing calculations are assigned the following meanings, each of which is known to those of skill in the art.

MCLK=The memory clock speed, in $MH_Z$

MEM_WID=The memory width: 32 bit, 64 bit, 128 bit

MEM_TYPE: Whether the memory type is SDR or DDR

MIN_MEM_EFF=80%: Minimum memory efficiency

For display 1 (primary CRT Controller):

PIX_CLK=Pixel clock ($MH_Z$)

PIX_DEPTH=Pixel depth (color depth in bpp)

PIX_WIDTH=Width of graphics display mode. Number of Active pixels

LINE_PERIOD=Period of display line: (Horizontal_total+1)*8/PIX_CLK

CURSIZE=Cursor size in octawords, 16 if color cursor 2 if mono cursor

ICONSIZE=Icon size in octawords=2, if icon supported

The number of active CRT controllers will also affect required frame buffer memory bandwidth. Accordingly, the same factors are considered for a second CRT controller.

---

*/
 For display 2 (secondary CRT Controller):
 PIX2_CLK = Pixel clock (MHz)
 PIX2_DEPTH = Pixel depth (color depth in bpp)
 PIX2_WIDTH = Width of graphics display mode. Number of
 Active pixels
 LINE2_PERIOD = Period of display line:
 (Horizontal_total + 1) * 8 / PIX_CLK
 CUR2SIZE = Cursor size in octawords, 16 if color cursor 2 if
 mono cursor
 ICON2SIZE = Icon size in octawords = 2, if icon supported
/* the next "if" statement determines the frame buffer memory
word width */
 If MEM_WID = 32, then
  BW_MULT = 4

```
        Else If MEM_WID = 64, then
            BW_MULT = 8
        Else // MEM_WID = 128
            BW_MULT = 16
        If MEM_TYPE = DDR, then
            BW_MULT = BW_MULT * 2
/* Determine the available bandwidth*/
        MEM_BW = MCLK * BW_MULT (MB/sec)
        AVAIL_MEM_BW = MEM_BW * MIN_MEM_EFF
/*Determine required memory bandwidth*/
        PEAK_DISP_BW = PIX_CLK * PIX_DEPTH / 8 +
        PIX2_CL *PIX2_DEPTH/8
        AVG_DISP1_BW = (16 * (CURSIZE + ICONSIZE) +
        CEILING(PIX_WIDTH *
PIX_DEPTH / 512)
* 64) / LINE_PERIOD
        (MB/sec)
        AVG_DISP2_BW = (16 * (CUR2SIZE + ICON2SIZE) +
        CEILING(PIX2_WIDTH *
PIX2_DEPTH / 512) * 64) / LINE2_PERIOD
        (MB/sec)
        AVG_DISP_BW = AVG_DISP1_BW +
        AVE_DISP2_BW (MB/sec)
        If PEAK_DISP_BW (and AVG_DIP_BW) < AVAIL_MEM_BW
Then,
        The display mode is supported
```

In the foregoing pseudo code, several display mode settings, which are determined by a processor's reading of the display mode data from memory, can be used to calculate or otherwise determine graphics processing requirements. The determined graphics processing requirements are compared to the memory bandwidth that is available at different graphics processing circuit 10 clock speeds. The available memory bandwidth is a function of clock speed, memory width, memory type. In light of the foregoing, those of ordinary skill in the art will recognize that the host CPU 12 or other processor can provide the functionality of determining graphics processing requirements. Similarly, the host CPU 12 or other processor can provide the functionality of varying the frequency of one or more clock sources used in, or used by, a graphic processing circuit, such as the graphics accelerator shown in FIG. 1 and identified by reference numeral 10. The host CPU 12 or other processor can also provide the functionality of directing a different clock source to either the graphics processing engines, or the frame buffer memory, during time intervals when the speeds of the programmable clock sources are stabilizing.

In light of the foregoing, those of ordinary skill in the art will recognize that the programmable PLL clock sources 40 and 42 and their associated control registers 44 and 46 respectively, provide the functionality of providing the ability to change the frequency of a clock source delivered to either a frame buffer memory, a graphics processing engine or other graphics processing circuitry, under software control so as to match graphics processing required of a graphics processing circuit, such as a graphics accelerator. The engine clock source multiplexor 35 and the memory clock source multiplexor 36 provide the functionality of providing a software changeable clock source for either a graphics processing engine or a frame buffer memory.

Those of ordinary skill in the art will recognize that FIG. 1 depicts components used in portable computing devices, such as laptop and portable computers, personal digital assistants or other similar devices. The system bus 14 provides a communication pathway for the host CPU 12, system memory, such as random access memory (RAM) and/or read only memory (ROM) 11 as well as input/output devices 13, such as a keyboard, pointing device, disk drives, etc. In addition to the foregoing, a display device (not shown for clarity) such as an LCD screen, is driven by the graphics accelerator 10. As set forth above, the display device and its associated mode settings will require graphics processing capability satisfied by the foregoing graphics accelerator 10. Once the graphics processing requirements of a display device are determined, the host CPU 12 can reduce the power consumed by the graphics accelerator 10 so as to extend the computer's battery life, which the other components of the computer use, by matching the clock speeds of the graphics accelerator to the display device requirements. Such portable computing devices thereby benefit from the power savings realized by using the aforementioned graphics accelerator 10 and method of saving power instead of prior art devices and methods that do not match clock speeds to requirements.

Figure 3:
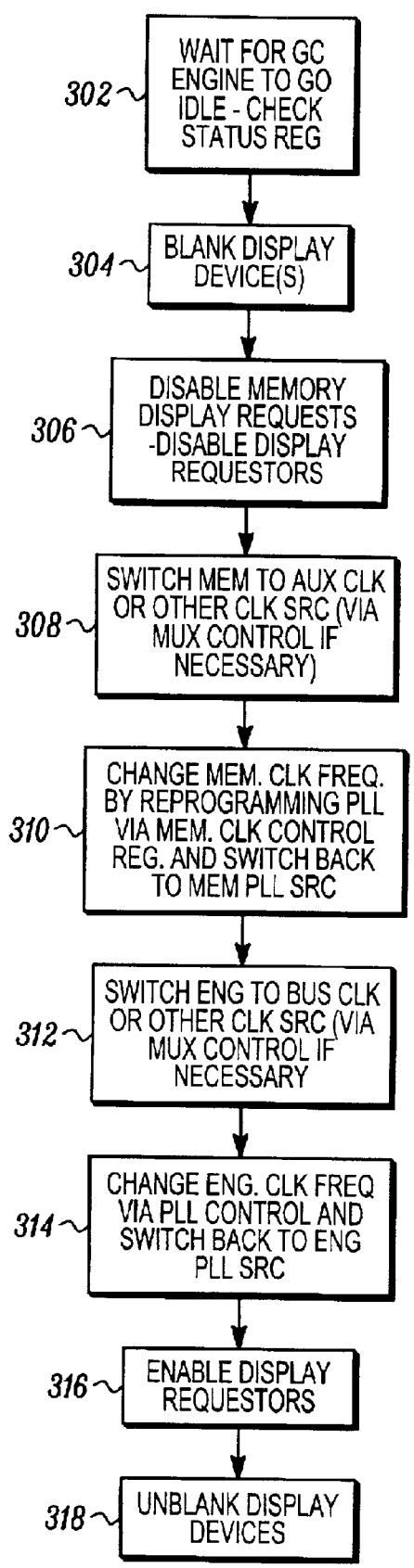
FIG. 3 depicts the steps of a method for implementing the clock speed modification method disclosed above.

FIG. 3 depicts the steps of a method for implementing the clock speed modification method disclosed above.

In step 302, the host processor 12 waits for the graphics controller engine or engines to go to an idle state. The idle state of the graphics controller engines 20 and 22 is usually indicated by a status register accessible to the host CPU 12 via the system bus 15.

At step 304, software running on the host CPU 12 instructs the graphics accelerator 10 to blank any display devices coupled to the graphics accelerator device.

In step 306, memory display requests are disabled.

At step 308, with respect to the frame buffer clock, the frame buffer memory clock source is switched to the auxiliary clock source 47, the engine clock 40 or some other available clock source. The process of switching the clock source to an interim clock so as to avoid anomalies attributable to the changing frequency of the programmable clock sources. In embodiments where the clock source selection multiplexors use selection circuits 19 and/or 21, the signal to change the clock source may have to include or account for those clock source selection circuits.

At step 310, the host CPU 12, or other processor writes a data to the control register or otherwise sends a data to the control register for the respective programmable clock source. In some embodiments, the control registers for the programmable clock sources may not be directly coupled to the address and/or control lines of the system bus 14 but may pass through other intervening control circuitry. The salient aspect of step 310 is that the CPU 12 changes the control registers content so as to change the clock frequency and as shown in FIG. 3, step 310 change the memory clock frequency.

After the programmable clock frequency has been changed by writing a new value to the control register, the processor will return the programmable memory clock source as the clock source delivered to the frame buffer memory.

Reprogramming the frequency of the programmable engine clock 40 takes place at step 312 by switching the graphics engine processors to an interim clock. This is accomplished by writing an appropriate value to the engine clock source select multiplexor 35 or its source selection circuitry 19.

At step 314, the programmable engine clock is reprogrammed to a new frequency by the CPU writing a value to its control register 44. After writing the new value to the control register, the processor returns the programmable engine clock source to the graphics engine and at step 316 enables the display requestors and in step 18 unblanks the video display device which will thereafter run at the new and reduced clock speeds.

By way of the foregoing method and apparatus, power conservation in a graphics processing device, such as the graphics accelerator shown in FIG. 1, can be maximized without sacrificing display graphics performance by matching graphics accelerator clock sources to the processing requirements. The power saving and graphics performance of prior art methods is clearly exceeded by the methods and apparatus claimed in the appended claims.

What is claimed is:

1. A method for reducing power consumption for a portable device employing a graphics processing circuit comprising:
    determining, by a processor, graphics processing requirements of said graphics processing circuit from, at least one display mode setting for a display device;
    varying, under control of the processor, the frequency of at least one clock source used by said graphics processing circuit so as to substantially match the speed of said at least one clock source to graphics processing requirements;
    determining when the power source for said graphics processing circuit has changed from an A.C. source to a battery;
    selecting a lower frequency for the at least one clock source that is less than its frequency prior to when the power source changed to a battery including;
        determining required frame buffer access bandwidth based on at least one of display mode setting data and whether a hardware overlay surface has been allocated;
        comparing the required frame buffer access bandwidth to the frame buffer access bandwidth provided by the lower frequency for the at least one clock source; and
        increasing the frequency for the at least one clock source until the frame buffer access bandwidth provided by the increased frequency matches the required frame buffer access bandwidth.

2. The method of claim 1 further including:
    determining whether a hardware overlay surface has been allocated; and
    varying, under control of the processor, the frequency of the at least one clock source to substantially match the speed of said at least one clock source, to the graphics processing required by the allocation of said hardware overlay surface.

3. The method of claim 1 further including determining that the power source for said graphics processing circuit has changed from an A.C. source to a limited-life power source, prior to performing the steps of determining graphics processing requirements and varying the frequency of at least one clock source.

4. The method of claim 1 further including detecting a temperature of said graphics processing circuit, prior to performing the steps of determining graphics processing requirements and varying the frequency of at least one clock source.

5. The method of claim 1 wherein determining graphics processing requirements includes calculating a required frame buffer access bandwidth using at least one of: pixel clock speed; pixel depth; pixel width; line period; cursor size; frame buffer memory width; frame buffer memory type; the size of icons used on a display device; whether the number of active CRT controllers is greater than one.

6. The method of claim 1 wherein varying the frequency of at least one clock source includes the step of varying the frequency of at least one of: a programmable phased-locked loop frame buffer memory clock source; a programmable phased-locked loop graphics processing engine clock source.

7. The method of claim 1 wherein varying the frequency of the at least one clock source includes the step of: a processor sending a value to a control register for at least one programmable phased-locked loop, thereby changing the speed of said programmable phase-locked loop.

8. The method of claim 1 further including switching to an interim second clock source during at least part of the time that the at least one clock source is being varied under software control.

9. The method of claim 1 wherein varying the frequency of at least one clock source includes:
    waiting for a graphics engine associated with the graphics processing circuit to go idle;
    blanking the display device;
    disabling a display controller that reads from the frame buffer;
    varying a frequency of a frame buffer clock source by reprogramming a PLL;
    enabling the display controller; and
    unblanking the display.

10. A graphics processing circuit comprised of:
    clock source multiplexor means for providing an interim clock source to at least one of: a graphics processing engine and a frame buffer memory, during at least part of the time that a programmable clock source for said graphics processing engine or a frame buffer memory is changed in response to signals from a CPU to said programmable clock source.

11. A computer device comprised of:
    a system bus;
    system memory coupled to said system bus;
    a host CPU coupled to said system bus and operative to:
        determine when the power source for said graphics processing circuit has changed from an A.C. source to a battery;
        select a lower frequency for the at least one clock source that is less than its frequency prior to when the power source changed to a battery by at least;
        determining required frame buffer access bandwidth based on at least one of display mode setting data and whether a hardware overlay surface has been allocated;
        comparing the required frame buffer access bandwidth to the frame buffer access bandwidth provided by the lower frequency for the at least one clock source; and
        increasing the frequency for the at least one clock source until the frame buffer access bandwidth provided by the increased frequency matches the required frame buffer access bandwidth;
    an input/output device coupled to said system bus;
    a display device, said display device having graphics processing requirements provided by a graphics accelerator;
    a power-consumption adjustable graphics accelerator coupled to said system bus and in communication with said host CPU, said power-consumption adjustable graphics accelerator having at least one of: a programmable graphics processing clock source and a programmable frame buffer memory clock source; said at least one programmable clock source being responsive to signals from said host CPU so as to adjust the speed of said at least one programmable graphics processing clock source and a programmable frame buffer memory clock source to match graphics processing requirements of said computer device.

12. A method for reducing power consumption for a portable device employing a graphics processing circuit comprising:

determining, by a processor, graphics processing requirements of said graphics processing circuit from, at least one display mode setting for a display device; and varying, under control of the processor, the frequency of at least one clock source used by said graphics processing circuit so as to substantially match the speed of said at least one clock source to graphics processing requirements;

wherein determining graphics processing requirements include calculating a required frame buffer access bandwidth using (a) pixel clock speed and pixel depth and pixel width and line period and frame buffer memory width; and (b) using at least one of: cursor size, frame buffer memory type, the size of the icon used on a display device, and a number of active CRT controllers used.

* * * * *